United States Patent
Bober (10) Patent No.: US 7,724,826 B2
(45) Date of Patent: May 25, 2010

(54) METHOD AND APPARATUS FOR MOTION VECTOR FIELD ENCODING

(75) Inventor: Miroslaw Z. Bober, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1317 days.

(21) Appl. No.: 11/131,267

(22) Filed: May 18, 2005

(65) Prior Publication Data

US 2005/0207500 A1    Sep. 22, 2005

Related U.S. Application Data

(62) Division of application No. 09/525,900, filed on Mar. 15, 2000, now Pat. No. 6,944,227.

(30) Foreign Application Priority Data

Mar. 16, 1999  (GB) .................. 9906034.5

(51) Int. Cl.
  *H04N 7/12* (2006.01)
  *H04N 11/02* (2006.01)
  *H04N 11/04* (2006.01)
  *H04B 1/66* (2006.01)

(52) U.S. Cl. ................. 375/240.22

(58) Field of Classification Search ............ None
See application file for complete search history.

(56) References Cited

U.S. PATENT DOCUMENTS

| | | | |
|---|---|---|---|
| 4,849,810 A * | 7/1989 | Ericsson | 375/240.12 |
| 5,150,209 A * | 9/1992 | Baker et al. | 375/240.02 |
| 5,471,252 A | 11/1995 | Iu | |
| 5,557,341 A | 9/1996 | Weiss et al. | |
| 5,574,663 A | 11/1996 | Ozcelik et al. | |
| 5,600,646 A * | 2/1997 | Polomski | 370/263 |
| 5,677,735 A | 10/1997 | Ueno et al. | |
| 5,692,063 A * | 11/1997 | Lee et al. | 382/107 |
| 5,719,631 A | 2/1998 | Pandel | |
| 5,748,247 A * | 5/1998 | Hu | 375/240.14 |
| 5,764,805 A * | 6/1998 | Martucci et al. | 382/238 |
| 5,793,430 A | 8/1998 | Hackett et al. | |
| 5,959,673 A | 9/1999 | Lee et al. | |
| 6,026,182 A | 2/2000 | Lee et al. | |
| 6,192,265 B1 * | 2/2001 | Carlsen et al. | 600/425 |
| 6,370,196 B1 * | 4/2002 | Griessl et al. | 375/240.16 |

(Continued)

FOREIGN PATENT DOCUMENTS

EP       0466981 A1    1/1992

(Continued)

OTHER PUBLICATIONS

Rajan L. Joshi et al., Lossy Encoding of Motion Vectors Using Entropy-Constrained Vector Quantization, IEEE, Oct. 23, 1995, pp. 109-112.

(Continued)

*Primary Examiner*—Nhon T Diep
(74) *Attorney, Agent, or Firm*—Birch, Stewart, Kolasch & Birch, LLP (57)   ABSTRACT

A method and apparatus for representing motion in a sequence of digitized images derives a dense motion vector field and vector quantizes the motion vector field.

11 Claims, 5 Drawing Sheets

U.S. PATENT DOCUMENTS 6,473,462 B1    10/2002    Chevance et al.
6,625,216 B1 *   9/2003    Zhu .................... 375/240.16

FOREIGN PATENT DOCUMENTS

EP    0720355 A1    7/1996
GB    2182521 A     5/1987

OTHER PUBLICATIONS

Xing C. Chen et al., Quadtree Based Adaptive Lossy Coding of Motion Vectors, Sep. 16, 1996, Stanford University, Computer Systems Laboratory, Stanford, CA.

L. Alparone et al., Adaptively Weighted Vector-Median Filters for Moton-Fields Smoothing, IEEE, May 7, 1996, pp. 2267-2270.

Klaus Illgner et al., Hierarchical Coding of Motion Vector Fields, IEEE, Oct. 23, 1995, pp. 566-569.

Dong-il Chang et al., Multistage Temporal Motion Compensation for Motion Vector Coding, IEEE, Sep. 16, 1996, pp. 271-274.

Arun Netravali et al., A Codec for HDTV, IEEE, Transactions on Consumer Electronics, vol. 38, No. 3, Aug. 1992, New York, U.S., pp. 325-340.

* cited by examiner

METHOD AND APPARATUS FOR MOTION VECTOR FIELD ENCODING

This application is a Divisional of application Ser. No. 09/525,900, filed on Mar. 15, 2000, now U.S. Pat. No. 6,944,227 and for which priority is claimed under 35 U.S.C. §120; and this application claims priority under 35 U.S.C. §119(a) on patent application No(s). 9906034.5 filed in United Kingdom on Mar. 16, 1999; the entire contents of all are hereby incorporated by reference.

The present invention relates to a method and apparatus for encoding motion vector fields for sequences of digitised images.

Figure 1:
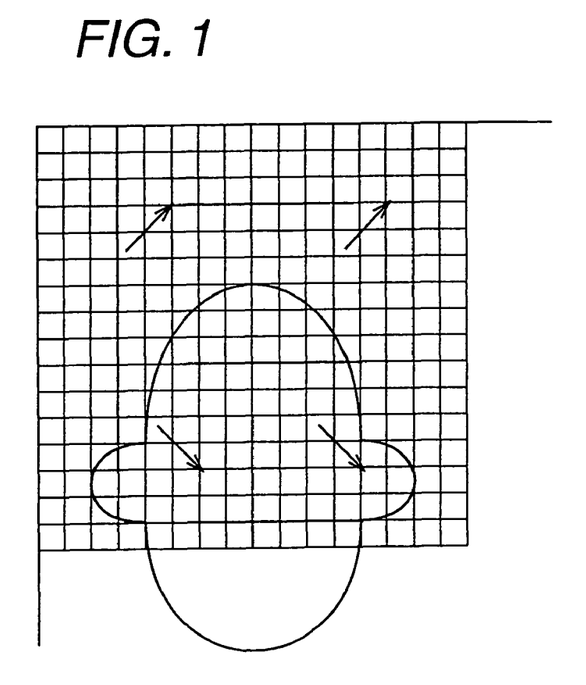
FIG. 1 is a representation of a motion vector field according to the prior art.

It is well known to use the principle of motion compensation for compression of digitised motion pictures. In the majority of the known approaches, including MPEG-1, MPEG-2 and H263, motion compensation is performed using square or rectangular blocks of pixels, and a motion vector is assigned to each block. For example, it is known to compare a block of pixels, for example, a 16×16 block, with blocks in a preceding reference image, usually within a limited region of the reference image. The block in the reference image which is most similar to the current block under consideration is found, using an algorithm such as minimum mean square error, and a corresponding motion vector is associated with the current block. Thus, 16×16 blocks in a current image are associated with a respective motion vector, as represented in FIG. 1. The motion vectors are subsequently quantized to either full-pel or sub-pel accuracy (usually half-pel or quarter-pel) and the result is usually encoded differentially.

Allocating a single motion vector to a block of pixels in an image in the known manner summarised above is useful for representing translation motion. However, there are a number of disadvantages in a block-based motion compensation approach of the type discussed above that can significantly limit the performance in prediction algorithms. For example, such an approach does not perform well for regions including motion, such as a rotation or a change in scale, which is more complex than simple translational movement. Also, block-based prediction is poor for non-rigid motion, such as that exhibited by clouds or humans, for example. Further, the block-based approach imposes motion boundaries along the blocks and may not accurately reflect motion boundaries within the blocks. Furthermore, reconstructed images may exhibit "blocky" artefacts, especially in situations where a motion boundary runs across a block.

In order to alleviate such problems, some schemes have employed variable block size motion compensation with parametric motion models (including quasi-affine and affine motion models in addition to a translation one). In those schemes, the size of the block used for motion compensation and the motion model depends on how many moving objects are present within a region and on the complexity of the motion field. Such an approach offers some improvements over the approach using blocks of a fixed size, but the improvement is limited.

The present invention provides a method and apparatus for representing motion in a sequence of digitized images by deriving a dense motion vector field for an image and performing vector quantization on the motion vector field.

In the context of this specification, the term dense in relation to a motion vector field means that for a pixel block of size 8×8 pixels there are at least two motion vectors. For example, a motion vector may be assigned to each 4×4 pixel block or each 2×2 pixel block. Preferably, a motion vector is assigned to each pixel.

As a result of the invention, an efficient representation of the motion field can be obtained for coding. A reconstructed image with improved visual quality can be obtained, as a result of better prediction using motion compensation and because the number of artefacts can be reduced. In particular, blocking artefacts can be reduced or eliminated entirely. Also, the approach lends itself to a scaleable representation of the motion field, with increased robustness to transmission errors, discussed in more detail below.

The invention also provides a method and apparatus for representing motion in a sequence of digitized images by generating and coding a plurality of versions of a motion vector field at different resolutions.

As a result of the invention, a scaleable representation of the motion field and an embedded bit stream can be created. Thus, a coarse version of the motion vector field can easily be reconstructed by decoding a part of the bit stream. This has several advantages. For example, if part of the bitstream is corrupted in transmission, a low resolution version of the motion field can still be recovered and used for motion compensation. Alternatively, some applications may only require a coarse version of the field, and thus processing power and memory requirements can be saved by reconstructing the coarse image directly from a truncated bitstream rather than reconstructing a full version then sub-sampling it to obtain a coarse version. Such an approach may be useful, for example, in video mobile telephones.

The invention also provides a method and apparatus for pre-processing a motion vector field to reduce the entropy without significantly reducing the prediction error. This can be done by averaging of the adjoining motion vectors, possibly with other constraints which limit the effects that such averaging may have on the quality of motion prediction and on the preservation of motion discontinuities.

The invention also provides a method and apparatus for processing data relating to an image in a sequence of digitized images comprising which identifies where motion discontinuities occur in the image, and smoothes the motion vector field by combining adjacent motion vectors taking account of where motion discontinuities occur in the image.

As a result, a more accurate reflection of the motion vector fields can be obtained.

These and other aspects of the invention are set out in the appended claims.

Embodiments of the invention will be described with reference to the accompanying drawings of which.

Figure 2:
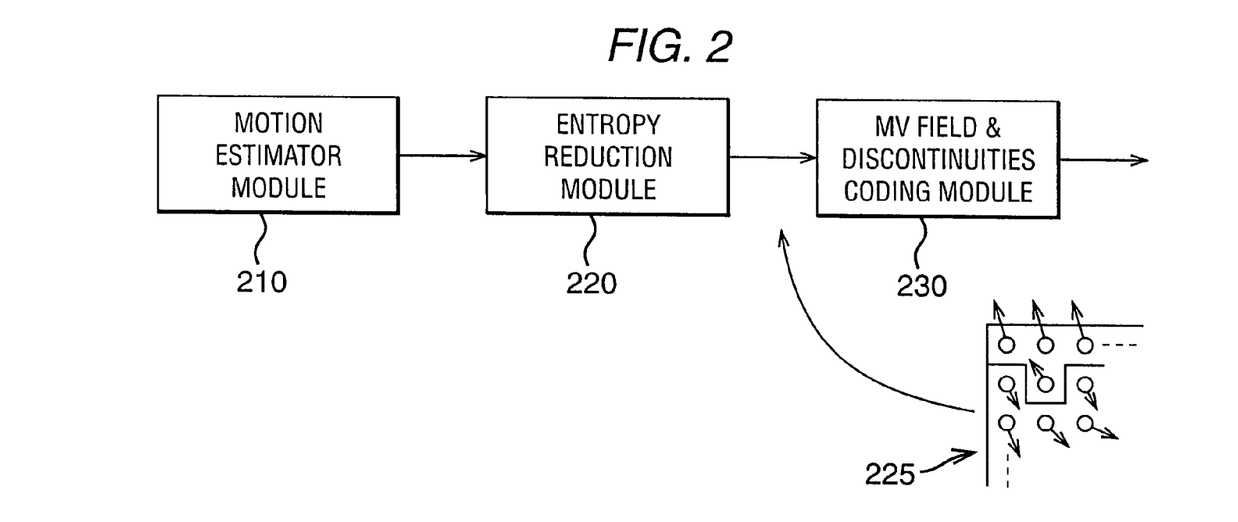
FIG. 2 is a block diagram of an encoder according to an embodiment of the invention.

FIG. 2 is a block diagram of a multi-resolution motion vector field (MMVF) encoder according to an embodiment of the invention. The MMVF encoder as shown in FIG. 2 includes a motion estimator (ME) module 210 for generating a motion vector field and a motion discontinuity map for an image in a sequence of images input to the module. The output of the motion estimator module is connected to the input of an entropy reduction module 220, which is for processing the motion vector field using the motion discontinuity map to produce an entropy constrained motion vector field with discontinuities. The output of the entropy reduction module 220 is connected to the input of a multi-resolution vector quantization motion field and discontinuities coding module 230, which is for producing a multi-resolution vector quantized (MMVF) representation of the motion vector field.

The operation of the MMVF encoder will be described in more detail below.

The motion estimator module 210 operates on a sequence of input image frames to produce dense motion vector fields, each with an associated motion discontinuity map.

A motion vector field for an image frame is derived using motion estimation based on the image frame and a reference frame. In this embodiment, the estimation is performed using reference frame which has been reconstructed from the coded version of the original of the reference frame and the consecutive, original, frame. As an alternative, for example, motion estimation could be performed using an original reference frame and the original consecutive frame.

The motion estimation is carried out using a variant of a known block-matching technique. A block of 16×16 pixels in the image frame is compared with blocks in the reference frame. When the closest match has been found, a corresponding motion vector is assigned to a reference pixel, which in this embodiment is the top left-hand pixel of the four centre pixels. In other embodiments, the reference pixel can be any pixel within an m×n block, but it is preferably lose to or at the centre of the block. These steps are repeated for overlapping 16×16 blocks in the image frame in order to obtain a motion vector for each pixel in the image, and consequently a motion vector field for the whole image. Although the motion vector field produced in this manner may still exhibit a block-like structure, an accurate dense motion-vector field is recovered in the entropy reduction module 220. Other methods for obtaining a motion vector for a pixel, such as pel-recursive techniques or gradient-based methods can be used, as described in "Digital Pictures—Representation, Compression and Standards" by A. Netravali and B. G. Haskell, Plenun Publishing 1995.

Figure 3:
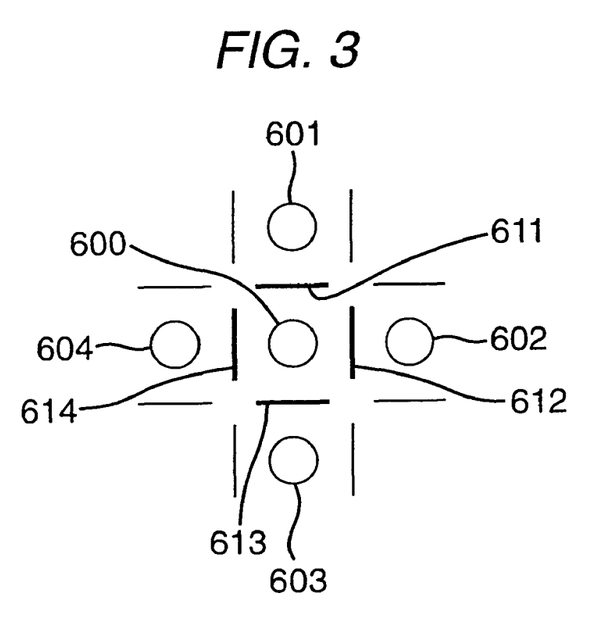
FIG. 3 is a representation of an image region showing discontinuity labels.

The motion estimator module 210 also generates a motion discontinuity map reflecting motion discontinuities in the image frame. In general, motion discontinuities are located in between pixels, and so each pixel has four discontinuity labels 611, 612, 613, 614 associated with it, one for each of the top, bottom, right and left sides, as shown in FIG. 3. Each discontinuity label is shared between two adjacent pixels. For example, the right discontinuity label 612 for pixel 600 is the left discontinuity label 612 for the pixel 602 neighbouring pixel 600 on the right.

Motion discontinuities in the image are identified using a suitable technique, such as the technique described in the paper "Robust Motion Analysis" by M. Bober and J. Kittler, CVPR, 1994, pp 947-952. Briefly, statistical analysis is used to estimate the spread of residual errors in a block with respect to the closest matching block in the previous frame. Pixels having a residual error outside an acceptable range are treated as belonging to a different motion region from those in the rest of the block. The boundaries between different motion regions are the motion discontinuities.

The motion vector field and the motion discontinuity map derived by the motion estimator module 210 are input to the entropy reduction module 220. The entropy reduction module 220 processes the motion vector field estimated in the motion estimator module 210, taking into account the motion discontinuity labels to preserve the motion boundaries, to produce an entropy-constrained motion vector field. The process is based on a pel-recursive technique, and is discussed in more detail below.

The processing for a single pixel in the image will be described for a single pixel with reference to FIG. 3. The central pixel 600 and its four neighbours: top, left, right and bottom 601, 602, 603, 604 are considered. In addition, the four motion discontinuity labels 611, 612, 613, 614 for the central pixel 600 are considered. Each pixel has a motion vector associated with it, say pixel 600 has a motion vector V600, and so on. After processing, a new value of the motion vector V600 is calculated for the central pixel.

The processing in this embodiment is based on taking a weighted average of the motion vectors of the centre pixel 600 and the motion vectors of those neighbouring pixels, 601, 602, 603, 604 which are not separated from the centre pixel by an active discontinuity label. More specifically, $$V600x(i+1)=[(k*V600x(i))+V601x(i)+V602x(i)+V603x(i)+V604x(i)]/(k+4)$$

and $$V600y(i+1)=[(k*V600y(i))+V601y(i)\ V602y(i)+V603y(i)+V604y(i)]/(k+4)$$

where V60nx(i) and V60ny(i) are the motion vector components assigned to pixels 60n in the ith iteration, and k is a constant greater than or equal to zero.

If one or more of the neighbouring pixels is separated from the centre pixel by an active motion boundary, it is omitted from the calculation, with adjustment of the denominator accordingly. For example, supposing the motion discontinuity label 611 is active, then V600x(i+1) is calculated as:

$$V600x(i+1)=[(k*V600x(i))+V602x(i)+V603x(i)+V604x(i)]/(k+3)$$

In an alternative embodiment, processing is again based on an average, but the prediction error is also taken into account. More specifically, $$V600x(i+1)=[(V601x(i)+V602x(i)+V603x(i)+V604x(i))/4]-PE/(m+\nabla^2 I)*\nabla xI)$$

$$V600y(i+1)=[(V601y(i)+V602y(i)+V603y(i)+V604y(i))/4]-PE/((m+\nabla^2 I)*\nabla yI)$$

Here, PE is the prediction error, that is the difference in luminance values between the pixel 600 and the pixel in the reference frame after displacement using the motion vector calculated in iteration i, that is V600(i), where V600(i)=(V600x(i), V600y(i)). $\nabla xI$ and $\nabla yI$ are the components of the image intensity gradient for pixel 600. The image gradient in this embodiment is calculated based on the luminance values of the centre pixel and a neighbouring pixel. In particular, $\nabla xI = I_{602}-I_{600}$ and $\nabla yI = I_{601}-I_{600}$, where $I_{60n}$ represents the luminance value of pixel 60n. The image gradient can be calculated in other ways using neighbouring pixels. For example, $\nabla xI$ and $\nabla yI$ can be calculated as $$\nabla xI = \frac{I_{602}-I_{604}}{2} \text{ and } \nabla yI = \frac{I_{601}-I_{603}}{2}.$$

$\nabla^2 I = (\nabla xI)^2 + (\nabla yI)^2$, and m is a constant greater than 0. In this alternative embodiment, m=100. Again, if one of the neighbouring pixels is separated by an active motion boundary, it is omitted from the calculation. Thus, supposing motion discontinuity label 611 is active, then $$V600x(i+1)=[(V602x(i)+V603x(i)+V604x(i))/3]-PE/((m+\nabla^2 I)*\nabla xI)$$

In each of the alternative processing methods described above, the processing is performed for all the pixels in the image, and a number of iterations, or passes, are performed. The order in which the pixels are processed in a single pass does not significantly influence results. In these embodiments, 5-10 iterations are performed, although the optimal number of iterations in other embodiments will depend on the type of motion estimator used.

As a result of the processing described above, a smoothed, entropy constrained, version of the motion vector field is obtained, with the motion discontinuities being preserved. By taking account of the motion discontinuity labels, and the prediction error in the second processing method described above, the smoothing is only performed in the areas where it does not reduce the efficiency of the motion compensation prediction. An example representation of a region of a motion vector field with motion discontinuities as output by the entropy reduction module 200 is shown, indicated as 225, in FIG. 2, where the circles represent pixels, the arrows represent motion vectors and the line between pixels represents a motion discontinuity.

The entropy constrained motion vector field with motion discontinuities produced by the entropy reduction module 220 is input to the multi-resolution motion vector field quantization (MMVFQ) and discontinuities coding module 230.

Figure 4:
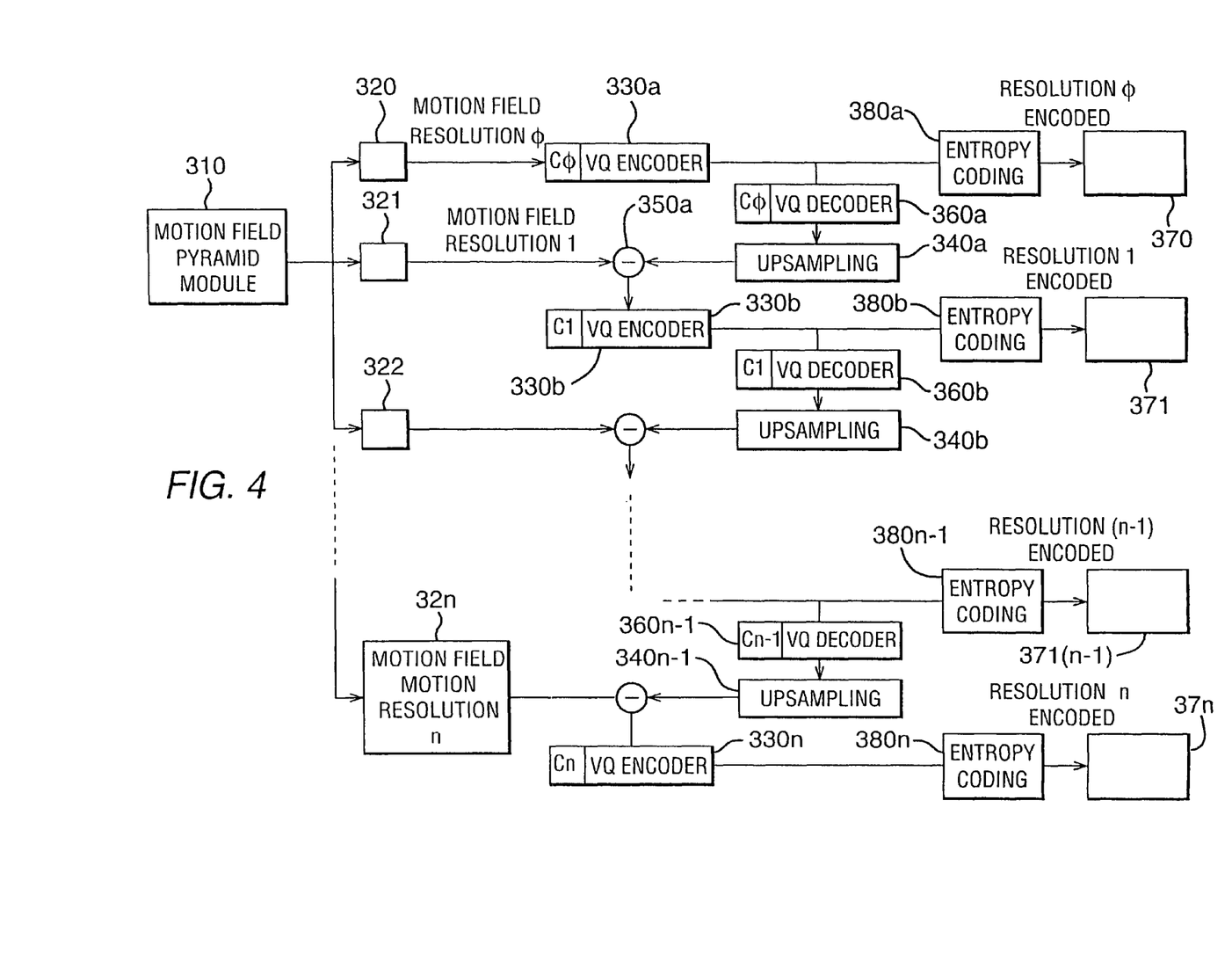
FIG. 4 is a block diagram of a component of the encoder shown in FIG. 2.

FIG. 4 shows the MMVFQ and discontinuities coding module in more detail.

Referring to FIG. 4, the motion vector field obtained from the entropy-reduction module 220 is input into a motion field pyramid module 310, which produces a set of n+1 motion fields which are versions of the original motion vector field at descending spatial resolutions. The n+1 motion fields have imaged resolutions s0 to sn, where the motion field at the original image resolution has resolution sn and the coarsest resolution motion field has a resolution s0. A motion field of resolution sm is obtained by low-pass filtering and sub-sampling of the higher resolution motion of resolution s(m+1). This process is carried out n times starling from the original motion field to produce the n+1 fields, called a pyramid of motion vector fields.

According to this embodiment, the sub-sampling factor k is 2, and the low pass filtering process averages the vx and vy values within a 2×2 block. The average values vx_aver and vy_aver are then taken to represent the motion of the block at the coarser resolution. However, various sub-sampling factors (k>1) and various low-pass filters can be used.

The pyramid of motion fields is then processed. The motion field at resolution s0 is encoded by a vector quantization (VQ) encoder 330a using a codebook c0. The output from the VQ encoder 330a goes to a module 380a for entropy encoding to form a representation of the motion field at the coarsest resolution s0, and to a VQ decoder 360a. The VQ decoder 360a uses the codebook c0 to reconstruct the coarse motion field, which is then passed to an up-sampling module 340a where the resolution of the motion field is increased by a factor of k. A differential module 350a calculates the difference between the motion field at resolution s1 and the up-sampled reconstructed motion field obtained from the field of resolution s0. The residual error motion field at resolution s1 so obtained is output from the differential module 350a to be processed by the VQ encoder 330b using a codebook c1. The steps described above are repeated recursively at increasing resolutions until the motion fields at all resolutions up to the original resolution have been processed, and n+1 component representations of the original motion vector field are obtained.

The vector quantization mentioned above is carried out on each of the motion vector fields in the encoding modules 330a-330n. The vector quantization is analogous to that described in "Scalable image coding using Gaussian pyramid vector quantization with resolution-independent block size" by L. Cieplinski and M. Bober, Proceedings IEEE International conference on Acoustics, Speech and Signal Processing, 1997, vol. 4, pp 2949-2952, where vector quantization is described in relation to the luminance values of a still picture. The contents of that paper are incorporated herein by reference.

The vectors to which vector quantization is applied at each resolution can be formed in one of the following ways:

1) By grouping o (o>1) component velocities from non-overlapping regions in the velocity component fields Vx and Vy independently. The regions should have identical shape and should cover altogether the entire velocity field. For each region, two o-dimensional vectors are formed VQx=(vx1, ... vxi, ... vxo), VQy=(Vy1, ... vyi, ... vyo), where vxi, vyi are the x and y velocity components of the pixel i within the block.

2) By performing a transformation on the vector field V, before forming the vectors as above. The purpose of the transformation is to make the component fields statistically independent, or to reduce their correlation in order to improve coding performance. For example, each vector v=(vx, vy) at each pixel location within the image may be transformed into log-polar representation vp=(vpr, vpa), where components vpa, vpr are defined as:

Vpr=square root (vx*vx+vy*vy)

vpa=arc tangent (vy/vx), if vx≠0.

Π/2, if vx=0 and vy>0

Π/2, if vx=0 and vy<0.

For each region, two o-dimensional vectors will be formed VQr=(vpr1, ... , vprj, ... , vpro), VQa=(vpa1, ... , vpaj, ... , vpao), where vprj, vpaj are obtained from the tnnsformation outlined above.

3) The component vectors VQx, VQy, as defined in 2), can be grouped together to form the vector VQ=(VQx, VQy) or VQ=(VQr, VQa), and VQ can be quantized. Naturally, the VQ vector formed in that way has the dimension 2o.

In this embodiment method 2) above is used with rectangular blocks of 2×2 pixels, so that VQ is performed on 4 dimensional vectors.

Figure 5:
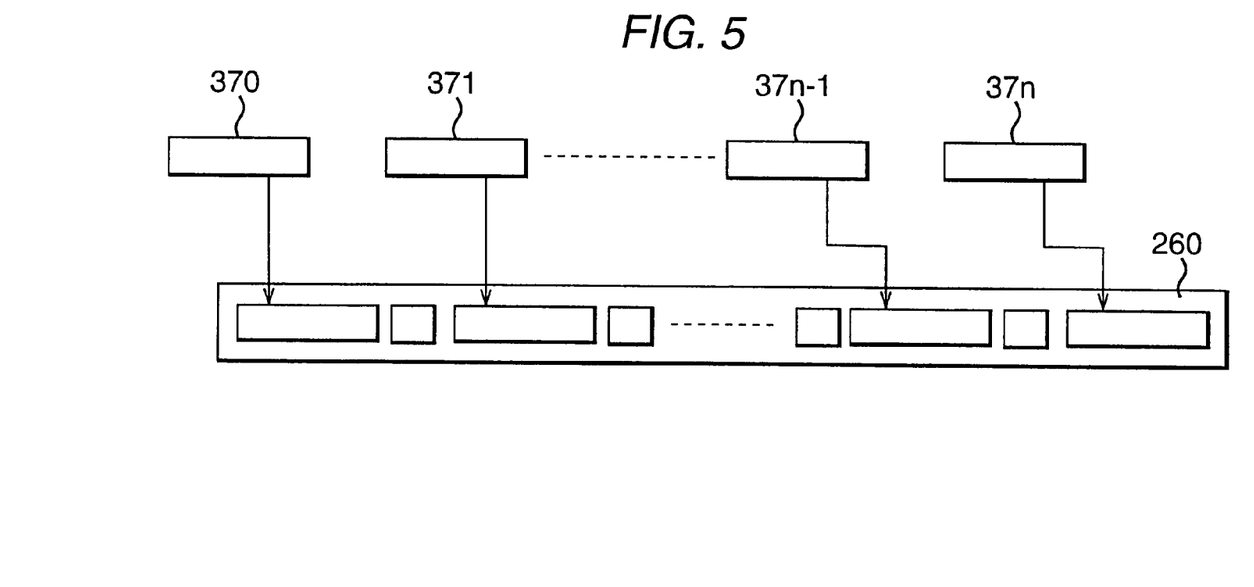
FIG. 5 is a representation of a bit stream output from the encoder shown in FIG. 2.

The component representations 370 ... 37n of the motion vector field output from the entropy coders 380a-380n are combined into an embedded representation 260, as shown, for example, in FIG. 5, which shows the component representations at the different resolutions separated by separators.

Figure 6:
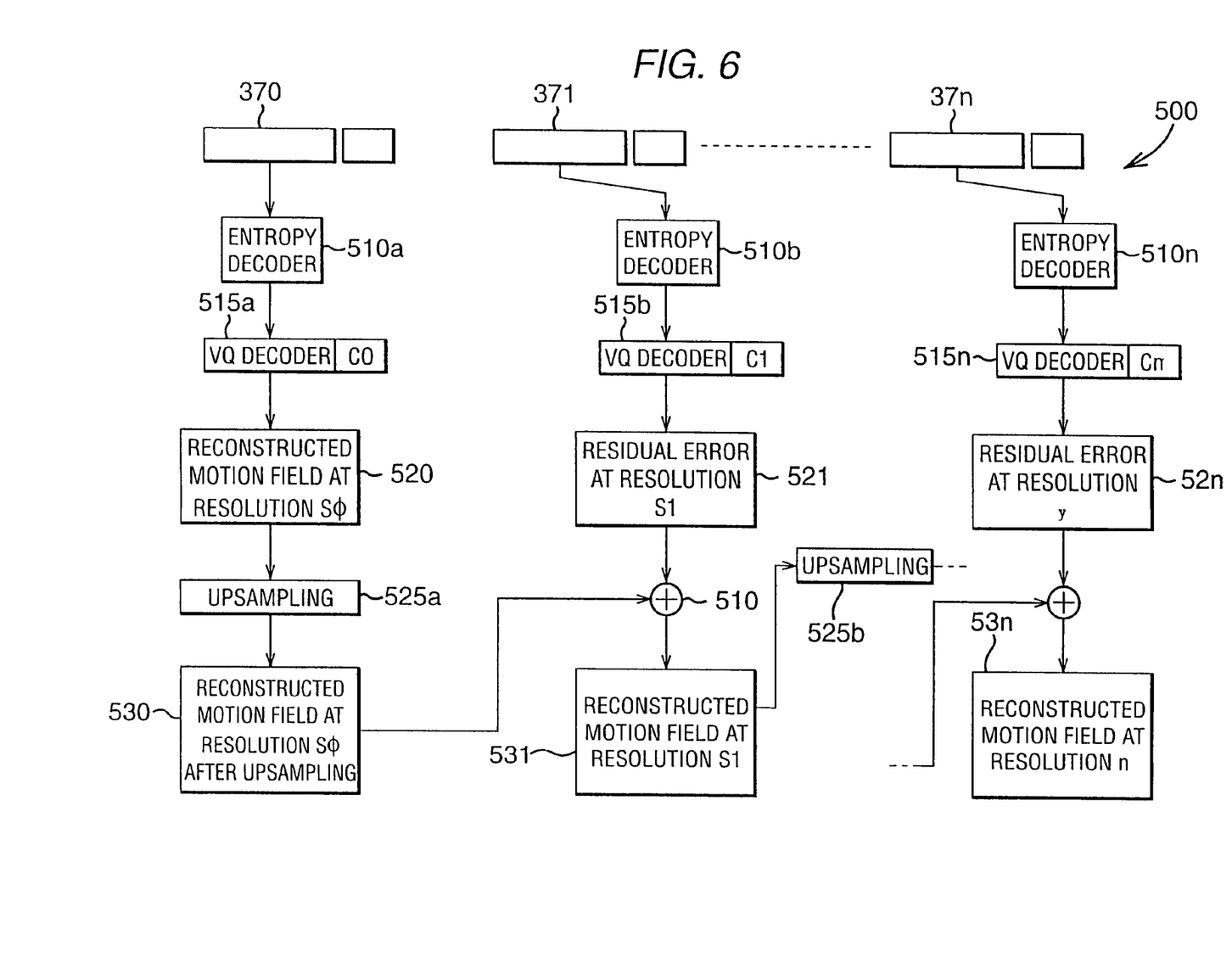
FIG. 6 is a block diagram of a decoder according to an embodiment of the invention.

A decoder 500 for decoding the embedded representation of the motion field to reconstruct the motion fields at different resolutions and the original motion vector field is shown in FIG. 6. The reconstruction starts from the coarsest resolution representation. It is decoded by an entropy decoder 510a and passed to a VQ decoder 515a, where it is decoded using the codebook c0 to obtain the reconstructed motion field at resolution s0. The reconstructed motion field at resolution s0 is then up-sampled by up-sampling module 525a, in the same way as in the encoder, to obtain an approximation of the field at resolution s1. The residual error for the motion field at resolution s1 is then reconstructed in a similar way. The residual error for resolution s1 and the field up-sampled from the field at resolution s0 are added together in a summation module to create a reconstructed motion field at resolution s1. The process is repeated at each finer resolution until the original resolution motion field is obtained. However, the process can be stopped at any resolution before the original resolution if desired.

Figure 7:
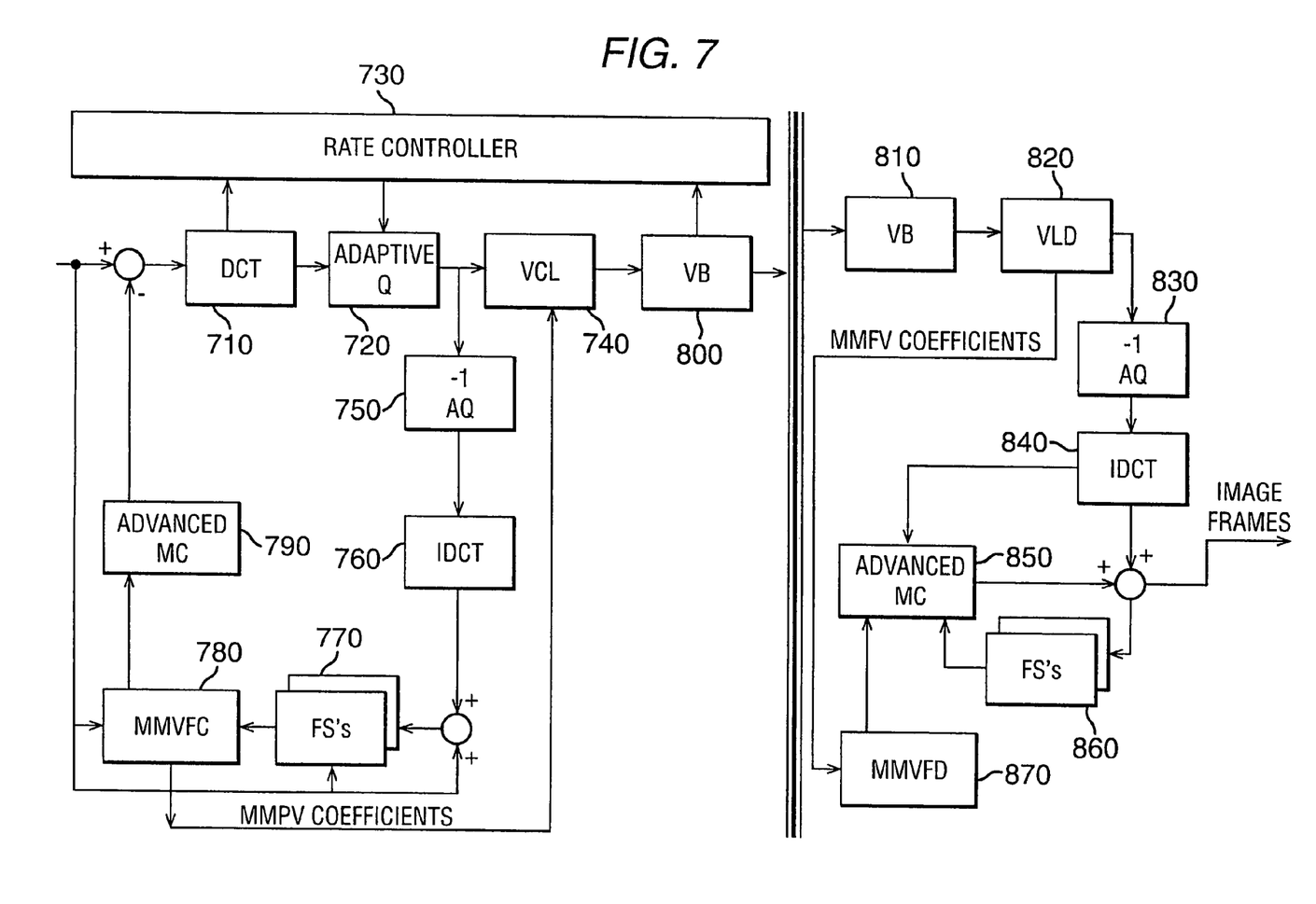
FIG. 7 is a block diagram of a hybrid DCT/MC codec according to an embodiment of the invention.

FIG. 7 shows an hybrid DCT/MC codec for coding and decoding video image data according to an embodiment of the present invention.

The coder side comprises a DCT module 710 for performing discrete cosine transforms on the input image data. The DCT module 710 is connected to a adaptable quantizer 720 for performing adaptive quantization on the DCT coefficient output from the DCT module. The quantizer 720 is controlled by a rate controller 730. The output of the quantizer 720 is connected to a variable length coder 740 and an inverse quantizer 750. The output of the inverse quantizer is connected to an inverse DCT module 760 for reconstructing a version of the original frame. The output of the DCT module 760 is connected to a plurality of frame stores 770. The outputs of the frame stores 770 are connected to a multi-resolution motion vector field (MMVF) coder 780, for deriving and encoding a motion vector field. The MMVF encoder 780 is connected to an advanced motion compensation module 790, for performing motion compensation in a known manner. The MMVF coder 780 also outputs data representing a coded motion vector field to the variable length coder 740, and the output of the variable length coder 740 is connected to a buffer 800. The buffer 800 is used to adjust the rate controller 730, and the stored data is output for transmission or recording on a recording medium.

Corresponding components are provided in the decoder, including a buffer 810, a variable length decoder 820, an inverse quantizer 830, an inverse DCT module 840, an advanced motion compensation module 850, frame stores 860, an MMVF decoder 870.

The coder and decoder operate essentially in a known manner for coding the video image data apart from the coding and decoding of the motion vector field using the MMVF coder 780 and decoder 870. The MMVF coder 780 and decoder 870 operate essentially as described above. However, here the variable length coder 740 and decoder 820 perfor the entropy coding and decoding in place of the entropy coders 380*a*-380*n* and decoders 515*a*-515*n* as described above. It is possible to use a single variable length coder 940 in place of the n entropy coders 380*a*-380*n*, employing different look-up tables for the image data at different resolutions, and likewise for the decoder 820.

The efficiency (based on the average number of bits per pixel) of the coding as described above can be similar to or better than for known methods. Although the allocation of a motion vector to each pixel increases the amount of motion information, this is reduced in subsequent processing, that is, in the entropy reduction processing and the vector quantization. The average number of bits per pixel will, of course, depend on the nature of data being coded.

In the embodiment of the invention described above, a motion discontinuity map is derived and used in subsequent processing, but it is not essential to take account of motion discontinuities. Instead of deriving a motion vector for each pixel, as in the described embodiment, the invention is also applicable to an approach where a motion vector can be assigned to a group of pixels, such as a 2×2 or 4×4 pixel block, for example. An important feature however is that the resulting motion vector field is dense.

The invention is particularly useful for applications dealing with sequences of images when one or more of the following conditions apply:
i) channel bandwidth is limited
ii) the risk of corruption of data is high, or
iii) the user may benefit from obtaining a low-resolution version of the motion data.

Motion information derived and represented in accordance with the invention can be stored in database and used for search and browse purpose. For example, a person looking for a sequence of particular type of movement can first obtain coarse motion information from that database (storing motion vector information obtained in accordance with the present invention), and then retrieve a selected sequence at original resolution.

The invention claimed is:

1. A method of representing motion in a sequence of digitized images comprising generating and coding a plurality of versions of a motion vector field at different resolutions, comprising the steps of:
   producing a motion vector field at a first, coarse, resolution and at a second, finer, resolution;
   up-sampling the coarse resolution version of the motion vector field;
   comparing the up-sampled coarse resolution version of the motion vector field with the finer resolution version of the motion vector field;
   coding the coarse resolution version of the motion vector field; and
   coding the finer resolution version of the motion vector field on the basis of the results of the comparison.

2. A method as claimed in claim 1 wherein:
   the step of producing a motion vector field at a first, coarse, resolution and at a second, finer, resolution comprises sub-sampling the motion vector field to produce sub-sampled versions of the field at a first, coarse, resolution and at a second, finer, resolution; the step of comparing the coarse resolution field with the finer resolution field produces a residual error, and
   the step of coding comprises coding the residual error at the finer resolution.

3. A method as claimed in claim 2 comprising producing and coding a sequence of residual errors at increasing resolutions.

4. A method as claimed in claim 1 comprising multiplexing the coded motion vector field versions at different resolutions into an embedded bit stream.

5. A method as claimed in claim 1 wherein said coding is performed using vector quantization.

6. An encoder for encoding motion information for a sequence of digitized images according to a method as claimed in claim 1.

7. A decoder for decoding motion information for a sequence of digitized images encoded according to a method as claimed in claim 1.

8. A method as claimed in claim 1 wherein at least one of the resolutions corresponds to a dense motion vector field.

9. Apparatus for representing motion in a sequence of digitized images comprising means for generating and coding a plurality of versions of a motion vector field at different resolutions, the apparatus further comprising:
   comprising the steps of:
   means for producing a motion vector field at a first, coarse, resolution and at a second, finer, resolution;
   means for up-sampling the coarse resolution version of the motion vector field;
   means for comparing the up-sampled coarse resolution version of the motion vector field with the finer resolution version of the motion vector field;
   means for coding the coarse resolution version of the motion vector field; and means for coding the finer resolution version of the motion vector field on the basis of the results of the comparison.

10. Apparatus as claimed in claim 9 comprising means for sub-sampling the motion vector field to produce sub-sampled versions of the field at a first, coarse, resolution and at a second, finer, resolution, means for comparing the coarse resolution field with the finer resolution field to produce a residual error, and means for coding the coarse resolution motion vector field and the residual error at the finer resolution.

11. Apparatus as claimed in claim 10 comprising means for producing and coding a sequence of residual errors at increasing resolutions.

* * * * *